Jan. 19, 1932.  K. NOLTE  1,841,759

SHEET PILING

Filed Aug. 14, 1930

Inventor
Karl Nolte
By Dowell and Dowell
Attorneys

Patented Jan. 19, 1932

1,841,759

UNITED STATES PATENT OFFICE

KARL NOLTE, OF DORTMUND, GERMANY

SHEET PILING

Application filed August 14, 1930, Serial No. 475,302, and in Germany July 16, 1929.

Sheet piling members of Z-section are known to be subject to the objection that, in ramming, they either spring out, or, if the locking joint is able in itself to stand the stress of ramming but is rolled with only slight tolerance in order to prevent springing out, they are very difficult to make draw into one another and carry the connecting adjacent members with them when rammed.

The overcoming of this objection and drawback is the purpose of this invention, which enables the ramming of the Z-section sheet piling, rolled with slight tolerance, to be facilitated in a surprisingly simple manner, without dragging adjacent pile members, and without necessitating special profiles within identical profile forms.

According to the invention, each pair of Z-section sheet piling members, rolled with a slight tolerance, are drawn together as an initial step, preferably in a rolling mill because of the considerable force required. How large or small the rolling tolerances are to be depends, on the one hand, on the circumstance that the pile members must still be capable of being drawn together, even though with great force, and that, on the other hand, the connection must be firm enough to prevent the joints from springing out in ramming. As a measure of the firmness of these connections it may for example be taken that they must be as strong as is otherwise attainable only by pressure directed in a plane approximately perpendicular to the axis of the wall and the joint elements, or by welding. In these so firmly connected Z-sections, the locking claw for the adjacent composite member, or channel structure is so far opened, or eased as it were, by the application of external forces, that the co-acting bulbous locking element of said adjacent member or channel structure can be easily inserted in the widened claw, said insertion, of course, being effected only on ramming in situ. The claw can be expanded, for example, by passing through a mandrel. Should it be desired to avoid cold working of the claw, the procedure adopted may consist in mounting a kind of guide chisel on the exit side of the final pass in the housing of the rolls, which expands the still glowing claw. However, the expansion can be effected in any other convenient manner.

Figure 1:
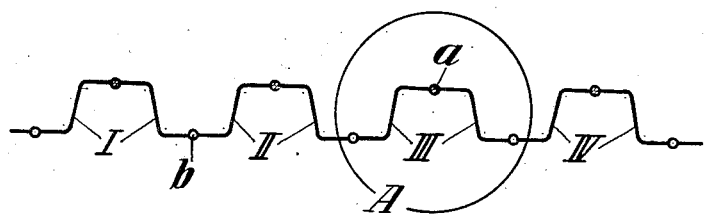

A typical embodiment of the invention is illustrated by the accompanying drawings, in which Fig. 1 is a diagrammatic plan of a wall of Z-section piling members, the joints of which are connected together with very small rolling tolerances (and therefore hold very tightly) being represented by solid circles $a$ whilst the joints which engage with greater freedom are indicated by rings $b$.

Figure 2:
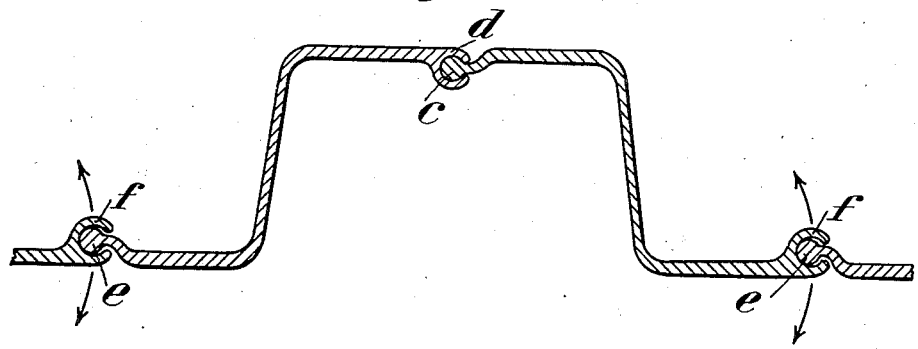

Fig. 2 shows, on a larger scale, a portion of the piling wall according to Fig. 1, namely that portion which is bounded by the circle, $A$ in Fig. 1. It will be seen that the bulb $c$ is gripped tightly in the claw $d$, and it may be mentioned that the entire absence of play is not essential, but that it will be sufficient if, as is inevitable in rolling, the two elements of the joint take a sinuous form, viewed in the longitudinal direction. Since the crests and hollows of the waves in the two joint elements are naturally different, it necessarily follows that, when the joint elements are made with small rolling tolerances, a firm mutual adhesion of the members occurs, thus naturally entailing a considerable expenditure of force in drawing the pile members together. The bulb $e$ and the claw $f$ are given the same dimensions, in rolling, as the corresponding joint elements $c$ and $d$. In accordance with the opening or expanding of the claw $f$, approximately in the direction of the arrows, which experience shews must be effected in forming corrugations, the drawing of the pile members into one another during ramming, is greatly facilitated, and the ramming proceeds by first driving the connected pair of members I, then II, III, IV and so on. Of course, the claw $f$ will not be expanded to such an extent that a springing out can occur, but only so far that the previously rammed members are not dragged along.

Figure 3:
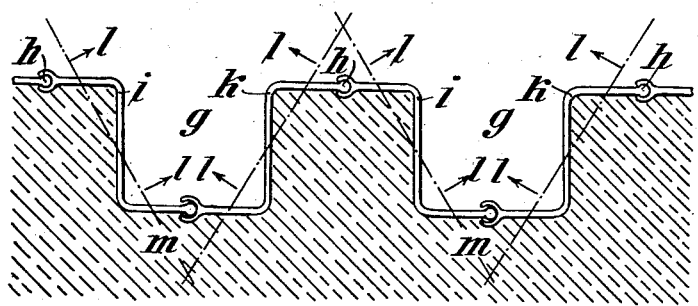

A further improvement is that the tight contraction is effected at those joints where tension stresses are to be expected in the finished sheet piling. This possibility is represented in Fig. 3, wherein $g$ is a sheet piling wall of Z-sections serving in the present case as a shore wall. The hatched portion denotes the land side. The Z-sections are drawn tightly together, in pairs, at $h$, before ramming and are thus united substantially as a unit. The directions of force in which the members tend to bend are indicated on the two pile members $i$ and $k$. The outward bending of the members occurs at right angles to these directions of force and is indicated by the arrows 1. It will be clearly evident that tension stresses occur at the points $h$ of the joints and compression stresses at the points $m$. The tension stresses in the joints $h$ tend to separate the Z-sections but this is prevented by the rigid connection produced by the tight constriction. The compression forces acting on the joints $m$ are, on the other hand, harmless. It is not difficult to ascertain what forces will occur in a sheet piling wall of Z-sections, especially since the loads to be expected are usually shown.

I claim:—

1. The method of constructing sheet-piling walls of Z-shaped sections, which consists in forming the sections with claw-socket portions along one side and with a bulbous marginal-edge along the other, opening up the socket portions of certain of the sections preferably while heated, connecting these certain sections in rigid pairs with others by pressure-closing the opened up socket portions thereof firmly over the bulbous edges of said others preferably while still heated to thereby form full channel sections each, and then at the place of erection interlocking the pairs by engaging the free bulbous edges of one section thereof in the free socket portions of a section of another with the compressed unions thereof at the side of the wall where tension stresses are expected to predominate and ramming the same successively without any tightening of the joints therebetween other than may result by yield-squeeze from the ramming operation.

2. The method of constructing sheet-piling walls of Z-shaped sections having open-socket claw portions along one side and bulbous marginal-edges along the other, which consists in opening up the claw portions of certain of the sections preferably while heated from formation in the rolling mill, connecting these certain sections rigidly in pairs with others by pressure-closing the opened up claw portions thereof firmly over the bulbous edges of said others preferably while still heated to thereby form full channel sections each, and then at the place of erection interlocking the pairs by engaging the free bulbous edges of one section thereof in the free claw portions of a section of another and ramming the same successively without any tightening of the joints therebetween other than may result by yield-squeeze from the ramming; the several sections being allowably of small tolerence at their points of interconnection.

In testimony whereof I affix my signature.

KARL NOLTE.